(12) United States Patent
Nadalet et al.

(10) Patent No.: US 12,495,926 B2
(45) Date of Patent: Dec. 16, 2025

(54) DEVICE AND PROCESS FOR PREPARING FROTHY MILK

(71) Applicant: CMA MACCHINE PER CAFFE' S.R.L., Susegana (IT)

(72) Inventors: Paolo Nadalet, Belluno (IT); Andrea Zonelli, Marcon (IT)

( * ) Notice: Subject to any disclaimer, the term of this patent is extended or adjusted under 35 U.S.C. 154(b) by 810 days.

(21) Appl. No.: 17/626,890

(22) PCT Filed: Jul. 23, 2020

(86) PCT No.: PCT/IB2020/056967
§ 371 (c)(1),
(2) Date: Jan. 13, 2022

(87) PCT Pub. No.: WO2021/014403
PCT Pub. Date: Jan. 28, 2021

(65) Prior Publication Data
US 2022/0248897 A1    Aug. 11, 2022

(30) Foreign Application Priority Data

Jul. 23, 2019   (IT) .................... 102019000012693

(51) Int. Cl.
A47J 31/44    (2006.01)
A47J 31/52    (2006.01)

(52) U.S. Cl.
CPC ....... *A47J 31/4489* (2013.01); *A47J 31/5253* (2018.08); *A47J 2202/00* (2013.01)

(58) Field of Classification Search
CPC ................ A47J 31/4489; A47J 31/5253; A47J 2202/00; A47J 31/52
USPC .......................................................... 426/231
See application file for complete search history.

(56) References Cited

U.S. PATENT DOCUMENTS

2005/0118319 A1    6/2005   Green et al.

FOREIGN PATENT DOCUMENTS

| | | |
|---|---|---|
| DE | 20 2018 005263 | 1/2019 |
| EP | 2478804 | 7/2012 |
| WO | 2016097923 | 6/2016 |
| WO | 2016207850 | 12/2016 |
| WO | 2017063936 | 4/2017 |

OTHER PUBLICATIONS

International search report and written opinion issued on Nov. 17, 2020 for PCT/IB2020/056967.

*Primary Examiner* — Erik Kashnikow
*Assistant Examiner* — Bhaskar Mukhopadhyay
(74) *Attorney, Agent, or Firm* — Themis Law

(57) ABSTRACT

Frothing device (1) to froth a beverage, especially milk, comprising: a steam source (2); a source (3) of pressurized air; a dispensing unit (4) to dispense air and steam to the beverage; an air flow rate regulating device (6) arranged downstream of the source (3) of pressurized air; a control unit (16) programmed to operate, in use, the simultaneous supply of steam and air to the dispensing unit (4), respectively from the steam source (2) and from the source (3) of pressurized air.

13 Claims, 2 Drawing Sheets

DEVICE AND PROCESS FOR PREPARING FROTHY MILK

This application is a U.S. national stage of PCT/IB2020/056967 filed on 23 Jul. 2020 which claims priority to and the benefit of Italian Application No. 102019000012693 filed on 23 Jul. 2019, the contents of which are incorporated herein by reference in their entireties.

FIELD OF THE INVENTION

The present invention relates to a device and a method for producing a hot frothy beverage, typically frothy milk, as well as a coffee machine comprising such a device and implementing such method. More in particular, the invention relates to a device to froth milk when preparing beverages containing frothy milk, such as for example cappuccino, latte and the like.

The invention is generally applied to food liquids able to be frothed. Frothing means the process of incorporating air into a liquid, i.e. the formation of an emulsion of air in the liquid, resulting in a fine dispersion of air bubbles in the frothy liquid.

KNOWN PRIOR ART

Devices for frothing and heating milk are known on the market; in fact, the milk is heated, generally with the injection of steam, to create frothy milk.

According to a known technique, milk is placed in a container, a duct dispensing steam, known as "steam wand", is submerged into the milk held in the container, thereby forming frothy milk; this method is generally used in commercial and HoReCa machines.

Devices for frothing and heating the milk into which the steam is mixed with the air to improve the frothing obtained are also known on the market.

EP 1501398 describes a coffee machine provided with a frothing device comprising a T-shaped manifold which is accessed by a steam inlet line and an air inlet line and from which a dispensing line of the air and steam mixture departs. The air inlet line is connected to a source of pressurized air, in this case created by a compressor, to regulate the air flow. In order to function properly, the compressor must work with a delivery pressure greater than the steam pressure. The air and steam mixture obtained in the manifold is delivered directly into a container inside which the milk contained therein is heated and frothed.

EP 2534986 describes a coffee machine provided with a frothing device in which pressurized air is supplied to the service boiler, i.e. to the boiler that generates the steam and heats the water needed for the production of beverages. The air and steam mixture is then conveyed to the dispensing duct which is immersed in the milk in the respective container.

The solutions discussed above have the drawback of not providing consistent frothing results during the operation of the machine.

OBJECTS OF THE INVENTION

Therefore there is a need to provide a frothing device to froth beverages, especially milk, which overcomes the problems set forth above.

A further object of the invention is to provide a device for heating and frothing milk, which can achieve a precise frothing of the milk while maintaining the maximum efficiency.

A further object of the invention is to provide a device for heating and frothing milk of simple production.

Such objects are achieved by means of the present invention, which concerns a frothing device to froth a beverage, a machine comprising such device and a respective operative method according to one or more of the accompanying claims.

SUMMARY OF THE INVENTION

In particular, a frothing device to froth a beverage according to claim 1, a machine according to claim 8 and a process according to claim 9 are object of the present invention. Preferred aspects are set forth in the dependent claims. In particular, an aspect of the present invention concerns a frothing device to froth a beverage, especially milk, comprising: a steam source; a source of pressurized air; a dispensing unit to dispense air and steam to the beverage, such dispensing unit being immersible into the beverage; an air flow rate regulating device arranged downstream of the source of pressurized air; a control unit programmed to operate, in use, the simultaneous supply of steam and air to the dispensing unit, respectively from the steam source and from the source of pressurized air.

It should be noted that the control unit is programmed so that the dispensing of air (separated from or mixed with steam) also occurs when the dispensing of steam from the dispensing unit occurs and the dispensing of air does not occur when the dispensing of steam from the dispensing unit does not occur. The control unit is thus programmed so that a single command involves the simultaneous dispensing of steam and air, thus allowing to heat and froth a beverage.

The air flow rate regulating device allows to precisely regulate the air flow rate downstream of the source of pressurized air. In fact, as is known, different factors can affect the air flow rate, among which temperature, humidity, etc. Moreover, the air is a compressible fluid, a factor which hinders a precise control on the flow rate thereof from the source, especially when the source comprises a pump for the air.

The use of a flow rate regulator allows to calibrate the air flow, thus notably improving the steam and air mixing, also controlling the amount of the two fluids, which translates into an improved quality of the frothy milk and into a greater uniformity of the bubbles forming the froth.

The control of the flow rate regulating device can be carried out in an open or closed loop by means of specific sensors.

In particular, according to a possible aspect, the control unit is programmed to regulate, in use, the air flow rate downstream of the source, also while dispensing, so that to bring the flow rate to the desired value, as a function of the dispensing time and/or the temperature of the beverage.

As discussed, according to a possible aspect, the source of pressurized air comprises a pump.

According to a possible aspect, the device comprises a sensor to detect the temperature of the beverage during the frothing thereof. Preferably, the sensor is placed, for example, side by side the air and steam dispensing unit. The sensor detects the temperature of the milk in proximity of the dispensing unit and transmits the data detected to the control unit which, once a preset temperature has been reached, provides to interrupt the dispensing of the frothing mixture, i.e. the air and steam mixture, to the milk. In a preferred embodiment, the dispensing of the air and steam mixture to the milk through the dispensing unit known in the art as wand or sprayer, is interrupted when the milk reaches a temperature in the range between 50° C. and 80° C., preferably between 55° C. and 65° C.

According to a possible aspect, the device further comprises: a first duct for connecting, directly or indirectly, the steam source to the dispensing unit; a second duct for connecting, directly or indirectly, the pressurized air source and the dispensing unit.

The flow rate regulating device is configured to divert part of the air flow coming out of the source of compressed air towards a different direction.

In preferred embodiments, the air flow rate regulating device comprises a diversion duct branching off from the second duct, and preferably a proportional valve (more preferably an electrovalve) operatively connected to the control unit.

It should be noted that a "direct" or "indirect" connection was discussed. In other words, the ducts create a fluidic connection between the dispensing unit and the respective source. Such connection is "direct" whenever the duct directly withdraws the fluid from the source to then deliver it to the dispensing unit, and is instead indirect whenever the ducts start or end in further ducts, which are in turn fluidically connected to the source or dispensing unit. Typically, an indirect connection provides that the respective duct withdraws the fluid from the source and delivers it to a further duct that brings the fluid to the dispensing unit. Moreover, it is possible that the first and second ducts merge with a single duct (i.e. that the second duct merges with the first duct), so that air and steam are at least partially mixed before reaching the dispensing unit.

According to a possible aspect, a valve, preferably an electrovalve, is arranged downstream of the steam source and is configured at least to alternatively allow or prevent the steam supply from the steam source to the dispensing unit.

An aspect of the present invention further concerns a machine for preparing beverages, comprising a frothing device according to one or more of the preceding aspects.

An aspect of the present invention further concerns a process for frothing a beverage, especially milk, with a device or a machine according to one or more of the aspects discussed above, wherein the control unit carries out the steps of: operating the simultaneous supply of steam and air from the steam and air sources to the dispensing unit; regulating the air flow rate by means of the air flow rate regulating device.

According to a possible aspect, the pressurized air source comprises a pump, and a valve is arranged downstream of the steam source, so that the control unit controls the operation of the pump simultaneously with the opening of the valve, so that to allow a simultaneous supply of air and steam to the dispensing unit.

An aspect of the present invention further concerns a data medium according to claim 11.

BRIEF DESCRIPTION OF THE FIGURES

With reference to the figures attached, exemplary and non-limiting embodiments of the present invention are now discussed, in which.

EMBODIMENTS OF THE INVENTION

Figure 1:
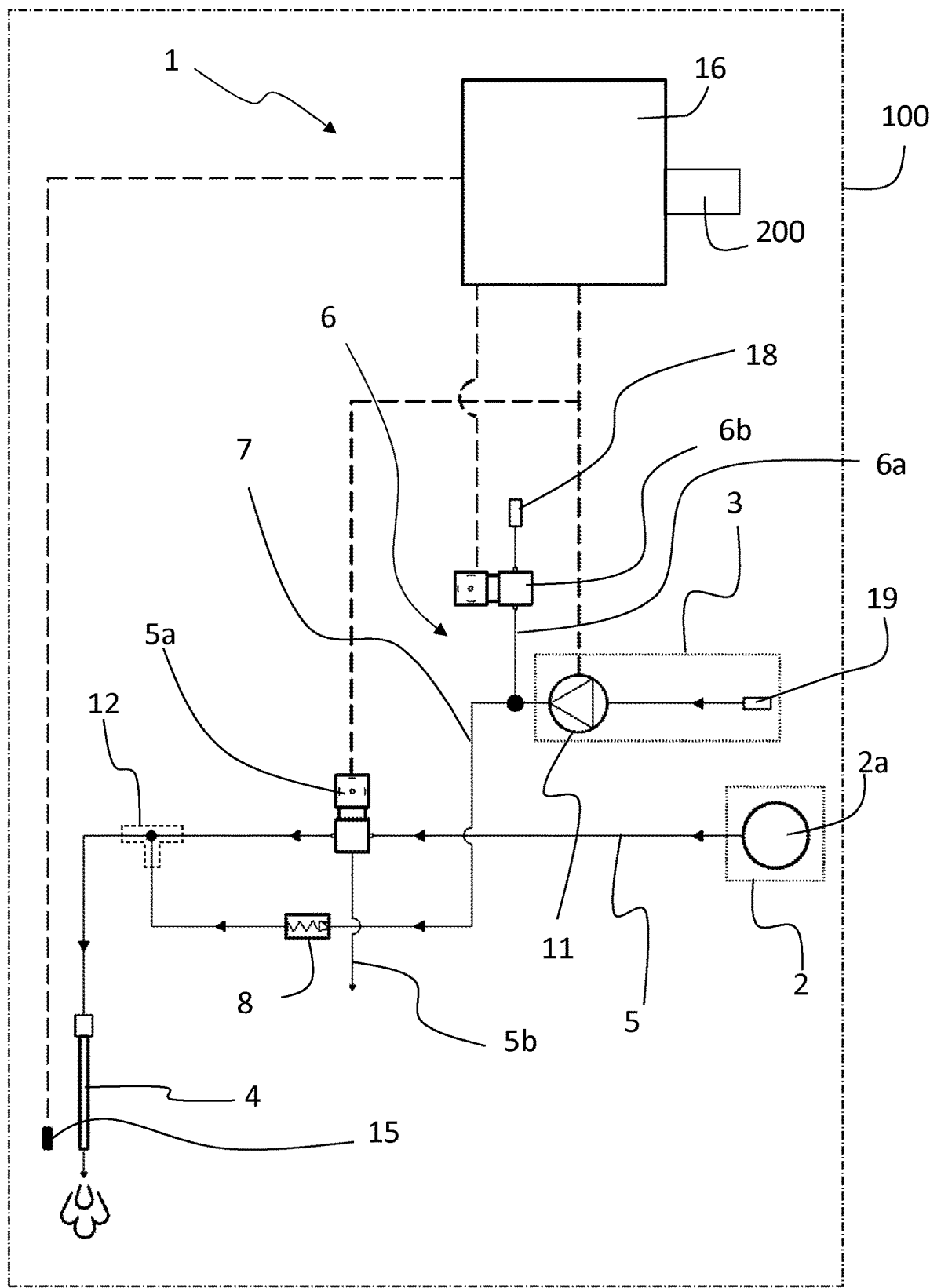
FIG. 1 is a scheme of a device according to the present invention.

A frothing device 1 to froth a beverage, especially milk, according to the present invention comprises a steam source 2 and a source 3 of pressurized air.

Different types of sources 2, 3, known in the art, adapted to supply steam and pressurized air, can be used. Typically, the steam source 2 comprises a boiler 2a. In preferred embodiments, such as the one schematically shown in FIG. 1, the source 3 of pressurized air comprises a pump 11 and, preferably, also a jet or gicleur 19, or any device adapted to determine a reduction of the passage section upstream of the pump 11.

According to a possible embodiment, the diameter of the passage section provided by the gicleur 19 is equal to 0.3 mm, however other passage section dimensions depending on the constructive requirements are not to be excluded.

A dispensing unit 4, typically in the form of a wand or similar element, is configured to dispense air and steam (coming from the respective sources 3, 2) to a beverage, typically by at least partially immersing the dispensing unit 4 into the beverage. Air and steam can be dispensed through two separate nozzles of the dispensing unit 4 or, preferably, in the form of mixture.

Ducts 5, 7 are typically arranged between the sources 2, 3 and the dispensing unit 4 so that to allow the supply of steam and air to the dispensing unit 4.

In particular, a first duct 5 fluidically connects the steam source 2 to the dispensing unit 4.

A second duct 7 fluidically connects the source 3 of pressurized air to the dispensing unit 4.

As previously discussed, the ducts 5, 7 are not necessarily directly connected to the dispensing unit 4. In possible embodiments, the fluidic connection between the source and the dispensing unit can be indirect, i.e. by means of a further duct. For example, in possible embodiments, such as the one shown, the first duct 5 directly connects the steam source 2 to the dispensing unit 4, whereas the second duct 7 indirectly connects the source 3 of pressurized air to the dispensing unit 4. In particular, the second duct 7 connects to the first duct 5, so that to convey an air and steam mixture to the dispensing unit 4. Whenever the first and second ducts merge into a single duct, preferred embodiments provide that a connecting element 12, for example a T-joint, is provided at the connecting point between the first and second ducts and configured so that to allow the inflow of air into the steam flow, for example by exploiting the Venturi effect.

In possible alternatives, steam and air can arrive separately to the dispensing unit 4, i.e. along ducts (or anyhow fluidic paths) separated from each other. Preferably, the first duct 5 is provided with a valve 5a, preferably an electrovalve, adapted to at least alternatively allow and prevent the steam flow towards the dispensing unit 4. Typically, as discussed, the steam source comprises a boiler 2a, whereby the steam is pressurized upstream of the valve 5a. The opening of the valve 5a thus allows the steam present in the first duct 5 upstream of the valve 5a to reach the dispensing unit 4.

According to a possible aspect, the valve 5a can be a three-way valve, so that to be able to channel the steam (or condensation, for example in the resting status of the device 1) towards a discharge duct 5b. The valve 5a can be a proportional valve, or a valve provided only with open and closed statuses.

An air flow rate regulating device 6 is present downstream of the source 3 of pressurized air, i.e. typically downstream of the pump 11.

Different types of flow rate regulating devices 6 can be used. Preferably, such as for example in the embodiment shown, the flow rate device 6 is configured to divert part of the air flow coming out of the air source 3 towards a different direction, typically towards another duct or directly to the outer environment. In other words, the flow rate regulating device 6 is typically configured to withdraw part of the air flowing downstream of the compressed air source 3.

According to a possible aspect, the flow rate regulating device comprises a diversion duct 6a branching off from the second duct 7. A valve 6b, typically an electrovalve, is preferably used to control the air flow through the diversion duct 6a. The valve can be a proportional valve, i.e. a valve whose degree of opening can be controlled, so that to assume one or more intermediate positions between the open or closed position. In other possible solutions, the valve can be a valve whose duty cycle can be controlled, so that to quickly determine the open and closed statuses of the valve in succession, so that to control the amount of air flowing in the diversion duct 6a. According to an aspect, such as shown for example in FIG. 1, the valve 6b is arranged solely on, i.e. connected with, the diversion duct 6a, preferably spaced from the branching point of duct 6a with duct 7.

Typically, the diversion duct 6a discharges into the environment. Preferably, a jet or gicleur 18, or any other device adapted to determine a reduction of the passage section, is arranged downstream of the valve 6b. According to a possible embodiment, the diameter of the passage section provided by the gicleur 18 is equal to 0.2 mm, however other passage section dimensions depending on the constructive requirements are not to be excluded.

In general, according to an aspect of the present invention, the jet or gicleur 18 placed in the diversion duct 6a preferably downstream of the valve 6b, has a smaller passage section with respect to the passage section of the jet or gicleur 19 placed upstream of the source 3 of pressurized air, preferably placed upstream of the pump 11.

Part of the air coming out of the source 3 of compressed air can be channeled towards the diversion duct 6a, so that to regulate accurately (and, in particular, decrease accurately) the air flow rate flowing inside the second duct 7 downstream of the diversion duct 6a, i.e. the air flow rate being supplied to the dispensing unit 4.

In general, the flow rate regulating device 6 is configured so that to allow to regulate the air flow rate downstream of the compressed air source 3.

According to a possible aspect, downstream of the flow rate regulating device 6, a non-return valve 8 adapted to prevent the return of fluid (air, or steam or air/steam mixture) towards the compressed air source 3, can be present.

The device 1 also preferably comprises a sensor 15 detecting the temperature of the milk during the frothing step thereof.

Temperature sensors of this type are known, available on the market and present on some coffee machine models.

The device 1 further comprises a control unit 16 connected with at least the flow rate regulating device 6 and configured to be able to operate the simultaneous dispensing of air and steam from the respective sources 3, 2 to the dispensing unit 4.

In particular, in preferred embodiments, the control unit 16 is connected with the valve 5a and with the pump 11, so that to send a command which actuates the pump 11 and opens the valve 5a. In other words, the control unit 16 is programmed so that the dispensing of steam depends on the dispensing of air, so that the two fluids are always dispensed simultaneously (from separate nozzles or in the form of mixture).

It should be noted that the logic connections between the control unit 16 and the respective components are shown by dotted lines in FIG. 1.

Therefore, in general, the control unit is programmed so that the air and steam are simultaneously conveyed to the dispensing unit 4 (separated or in the form of mixture), and to control in a precise way the air flow rate reaching the dispensing unit 4, by means of the flow rate dispensing device 6. In a known way, the control unit 16 can also be connected to other components, for example with the temperature sensor of the beverage 15.

An aspect of the present invention further provides that the frothing device 1 to froth milk is integrated (or connected) with a machine 100 for preparing beverages.

The process according to the invention provides to immerse the dispensing unit 4 into the beverage and to simultaneously supply steam and air to the dispensing unit 4 so that to dispense air and steam therefrom, preferably an air-steam mixture, to froth the beverage; simultaneously, by means of the flow rate regulating device 6, it is possible to regulate the air flow that reaches the dispensing unit 4. Such control can be carried out by means of an open-loop control (for example the air flow rate regulation can be controlled as a function of the type or quality of beverage selected by a user), or a closed-loop control, by the feedback provided by a respective sensor.

In possible solutions, the flow rate regulator 6 can be operated as a function of the dispensing time, i.e. the air flow rate can be regulated in a predetermined way while dispensing. Different types of beverages can involve different behaviors of the flow rate regulator.

In addition or as an alternative, the flow rate regulator 6 can be operated as a function of the temperature of the beverage, for example detected by the temperature sensor 15.

It should be noted that such regulation by means of the regulating device 6 involves a modification (typically a reduction) of the air flow rate towards the dispensing unit 4. However, the control unit 16 is programmed so that the dispensing unit 4 always dispenses, in use, both air and steam, i.e. the flow rate regulating device 6 is configured to modify the air flow rate, but not to prevent the air from being dispensed from the dispensing unit 4, while steam is dispensed from it, such as for example schematically shown in FIG. 2.

Figure 2:
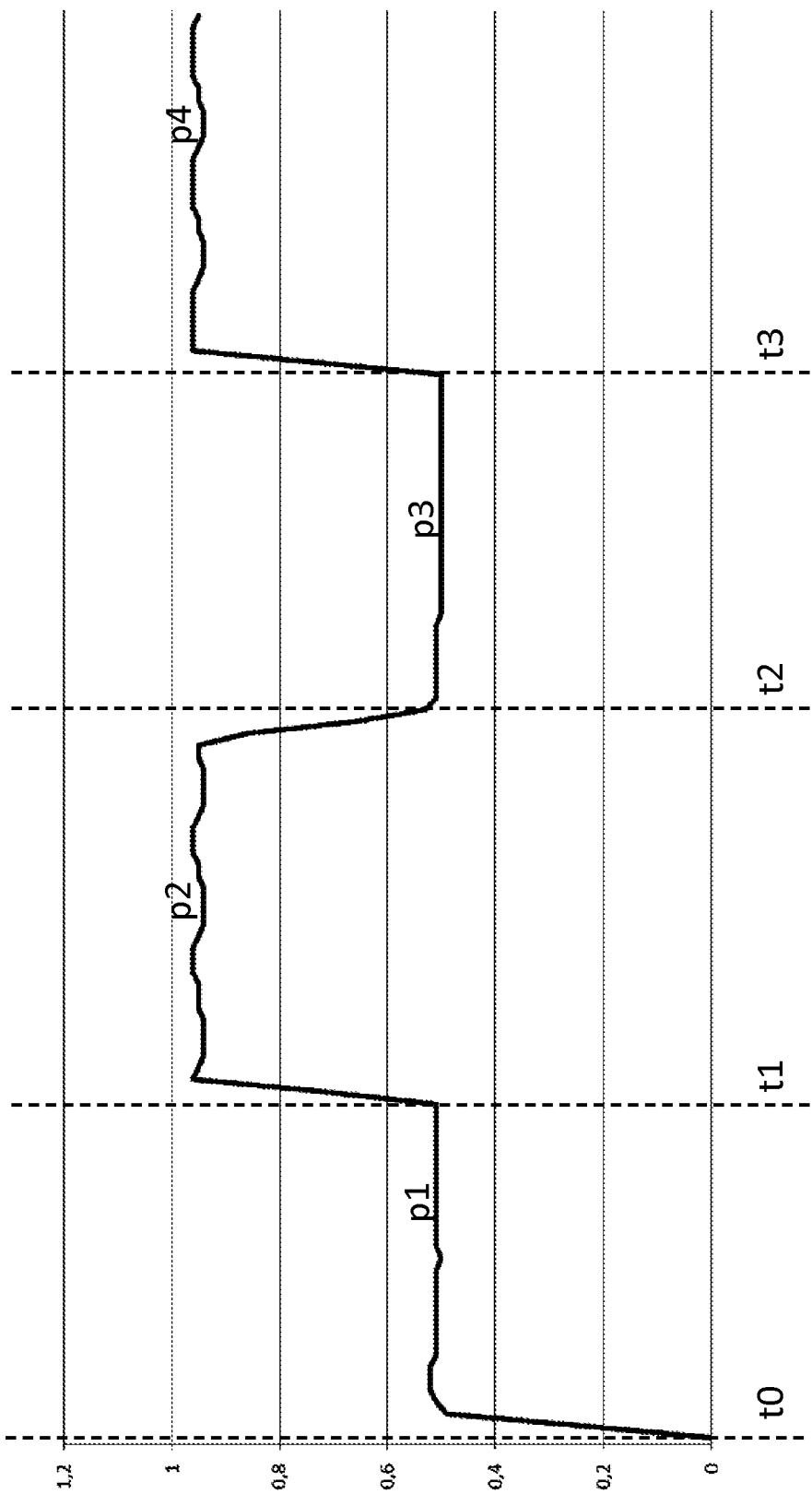
FIG. 2 is a graph depicting a possible trend of the air pressure as a function of the dispensing time.

In particular, FIG. 2 shows a possible trend of the air pressure (measured in the second duct 7 downstream of the branching point of the diversion duct 6a and shown on the axis Y in the graph of FIG. 2, in bars) as a function of the dispensing time (shown on the axis X in the graph of FIG. 2).

In particular, at time t0, the control unit 16 operates the simultaneous activation of the pump 11 and the opening of the valve 5a. In this step, the valve 6b is also open, so that to divert part of the air flow towards the outside, through the diversion duct 6a. The air pressure in the duct 7 thus typically reaches a first pressure value p1 (for example equal to about 0.5 bars). Afterwards, at time t1, the valve 6b is closed, so that to interrupt the air flow in the diversion duct 6a. The air pressure in the second duct 7 rises. Typically, the air pressure in the second duct 7 rises until reaching a second pressure value p2 (for example of about 0.9 bars), greater than the first pressure value p1. The control unit can thus operate the valve 6b so that to further vary the air pressure value. For example, in the embodiment shown in FIG. 2, at time t2, the valve 6b is open, so that to decrease the air pressure to a third value p3 (generally substantially equal to the first value P1), and is closed again at time t3, so that to cause a pressure increase up to a fourth value p4 (typically equal to the second value p2).

Obviously, although reference was made to the pressure values p1 and p2, respectively of about 0.5 bars and 0.9 bars (for example with reference to FIG. 2), such values are not limiting and further pressure values can be used in further possible embodiments. It should be not that the pressure value of the steam dispensed from the source 2, for example a boiler, can also be selected conveniently. For example, according to a possible embodiment, the steam in the boiler can have a pressure of about 1.1.-1.2 bars. Embodiments wherein the steam pressure, for example in the boiler, is between 0.8 bars and 1.9 bars are not however excluded.

The control unit 16 thus provides to simultaneously stop the dispensing of steam and air on command, or after a preset time, or upon reaching a preset temperature (for example by using a signal from the temperature sensor 15). It should be noted that the trend of the air pressure following the interruption of the dispensing of steam and air is not shown in FIG. 2. In a predictable way, the air pressure in the duct decreases to zero, i.e. returns to the environmental pressure value.

In particular, in preferred embodiments, following a user command (for example following the pressure of a user on a button in a respective interface), the control unit 16 activates the pump 11 and, simultaneously, operates the opening of the valve 5a, so that to simultaneously dispense air and steam (typically in the form of mixture) from the dispensing unit 4. The dispensing unit 4 is typically at least partially inserted into the milk (or the beverage to be frothed) so that the air and steam are dispensed into the milk.

The step of heating and frothing the milk occurs from this point on, until the temperature sensor 15 detects the reaching of a programmed temperature, which is typically in the range between 50° C. and 80° C., preferably between 55° C. and 65° C. If necessary, the air flow rate reaching the dispensing unit 4 (and thus delivered by it into the beverage to be frothed) is regulated by means of the flow rate regulating device 6, for example by opening the valve 6b, so that to channel part of the air flow coming out of the pump 11 into the diversion duct 6a.

Consequently, the control unit 16 closes the valve 5a and deactivates the pump 11, so that to interrupt (simultaneously) both the flows of air and steam from the dispensing unit 4.

According to the invention, it is also possible to provide a non-transitory data medium 200 adapted to be read by the logic unit 16, so that to allow the latter to carry out the method discussed above.

It should be noted that, even though reference was made to an exemplary embodiment in the previous description, the invention can also be implemented according to a high number of variants. In fact, the embodiment described is merely exemplary and must not be understood in any way as the protection scope, configuration or application of the invention. On the contrary, the description above should be considered as a guide for implementing at least one embodiment of the invention; a number of modifications to those described may be made to the exemplary embodiment, without departing from the protection scope of the invention.

The invention claimed is:

1. A frothing device to froth a beverage, comprising:
   a steam source;
   a source of pressurized air;
   a dispensing unit to dispense air and steam to the beverage, immersible in the beverage;
   an air flow rate regulating device arranged downstream of the source of pressurized air;
   a control unit programmed to operate, in use, a simultaneous supply of steam and air to the dispensing unit, respectively from the steam source and from the source of pressurized air;
   a first duct for carrying the air from the source of pressurized air to the dispensing unit; and
   a second duct for carrying the steam from the source to the first duct, a valve being interposed between the steam source and the first duct to control a flow of the steam to the first duct,
   whereby the frothing device is configured to transfer the air to the dispensing unit without an intermediate tank, and to add a desired amount of the steam to the air by operation of the valve.

2. The frothing device according to claim 1, wherein said control unit is programmed to regulate, in use, an air flow rate downstream of said source by means of said air flow rate regulating device as a function of a dispensing time and/or a temperature of the beverage.

3. The frothing device according to claim 1, wherein said source of pressurized air comprises a pump and/or said steam source comprises a boiler, and wherein said control unit is programmed to control said pump and/or said valve.

4. The frothing device according to claim 1, further comprising a sensor to detect a temperature of the beverage during a frothing thereof.

5. The frothing device according to claim 1, wherein the air flow rate regulating device is configured to divert at least part of an air flow coming out of the source of pressurized compressed air so as to enable a continuing operation of the source of pressurized air during frothing regardless of an amount of the air desired to reach the dispensing unit.

6. The frothing device according to claim 5, wherein said source of pressurized air is connected with said dispensing unit immersible with a plurality of branches, and wherein a connecting device receives the air from the source of pressurized air from a first branch of the first duct, the steam from the second duct via the valve, and conveys the air and the steam to the dispensing unit via a second branch of the first duct.

7. The frothing device according to claim 5, wherein the flow rate regulating device is configured to divert part of the air flow coming out of the source of pressurized air towards the outer environment.

8. A process for frothing a beverage, said process comprising:
   immersing a dispensing unit of a frothing device according to claim 1 into the beverage, wherein the control unit carries out the steps of:
   i. operating the simultaneous supply of the steam and the air from said steam source and said pressurized air source to said dispensing unit; and
   ii. regulating an air flow rate by means of said air flow rate regulating device.

9. The process according to claim 8, wherein the pressurized air source comprises a pump, and a valve is arranged downstream of the steam source and wherein, in step (i), the control unit controls an operation of said pump simultaneously with an opening of said valve, so as to allow a simultaneous supply of the air and the steam to said dispensing unit.

10. The frothing device according to claim 5, wherein said air flow rate regulating device further comprises a second valve operatively connected to said control unit.

11. The frothing device according to claim 10, wherein said second valve is a regulation valve positioned on said a diversion duct extending from the first duct.

12. The frothing device according to claim 10, wherein said second valve is a regulation valve, and wherein two devices adapted to determine a reduction of a passage section are respectively arranged upstream of a pump for the pressurized air and downstream of the regulation valve.

13. The frothing device according to claim 10, wherein said second valve is an electrovalve.

* * * * *